INVENTOR.
Carl L. Nigh

United States Patent Office 3,380,789
Patented Apr. 30, 1968

3,380,789
BEARING MEANS PARTICULARLY FOR
OSCILLATING MOTION
Carl L. Nigh, Brownsburg, Ind., assignor to General
Motors Corporation, Detroit, Mich., a corporation
of Delaware
Filed Feb. 23, 1966, Ser. No. 529,350
3 Claims. (Cl. 308—78)

ABSTRACT OF THE DISCLOSURE

A piston pin bearing arrangement for improved lubrication characteristics in which an elliptical pin is secured to and oscillates with the connecting rod and engages an arcuate bearing member carried by the piston. The elliptical shape of the pin has its minimum curvature in a central portion engaging the bearing member and has a gradually increasing curvature on either side thereof to provide wedge shaped relieved portions so as to assist the entry of lubricant to the bearing member and the piston pin surfaces during operation.

This invention relates to bearing means and more particularly to bearing means for use between relatively oscillatable members to provide improved lubrication characteristics. In its more specific aspects, the invention provides a piston pin bearing for an internal combustion engine having improved lubrication characteristics.

A specific embodiment of the invention contemplates an improved trunnion-type piston pin connection between the piston and connecting rod of an internal combustion engine wherein a piston pin secured to the end of the connecting rod is formed in the shape of an elliptical cylinder and is received in load transmitting relationship with an arcuate bearing member carried by the piston. The elliptical piston pin is so formed that it conforms closely to the curvature of the bearing member in its central high load carrying portion but has increasing curvature of its surface away from the high load carrying portion. This results in increased clearance between the piston pin and the bearing member along the edges of the bearing member and permits the oscillating motion of the components to more easily work oil, supplied along the edge of the bearing, into position between the piston pin and the bearing to lubricate the load transmitting surfaces.

Many proposals have been made in the past for improving the lubrication of piston pin bearings particularly in such severe applications as two-cycle diesel engines where the forces acting on the piston continually exert a downward thrust on the piston pin bearing thus preventing the bearing from lifting off the piston pin surface as can occur during the thrust reversals present in four-cycle engines. Other arrangements have been proposed for artificially increasing the clearance between the piston pin and the piston carried bearing including eccentric bearing members which rock the load from one portion of the bearing surface to another during different portions of the cycle and deformable piston pin members which vary their conformability to the bearing surface in accordance with the load placed upon them. However, the prior proposals appear to be somewhat more complicated than the arrangement of the present invention.

The various features and advantages of the invention will be more clearly understood by reference to the following description and drawings of a preferred embodiment of the invention selected for the purpose of illustration and in which.

Figure 1:
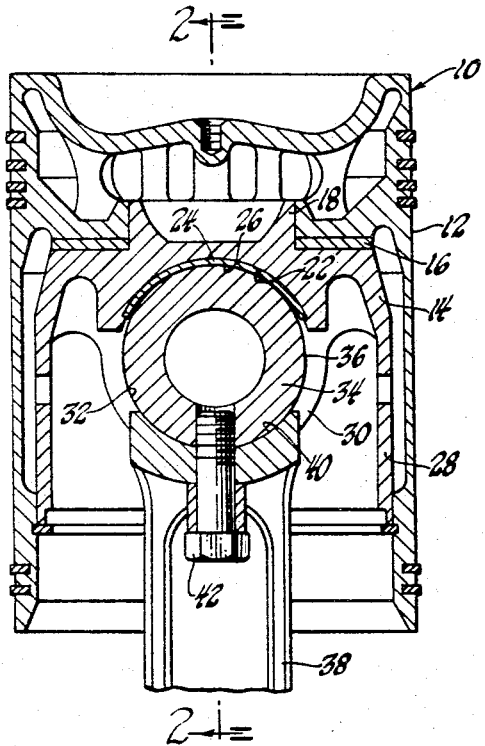
FIGURE 1 is a cross sectional view of a piston and connecting rod assembly embodying bearing means according to the invention.
Figure 2:
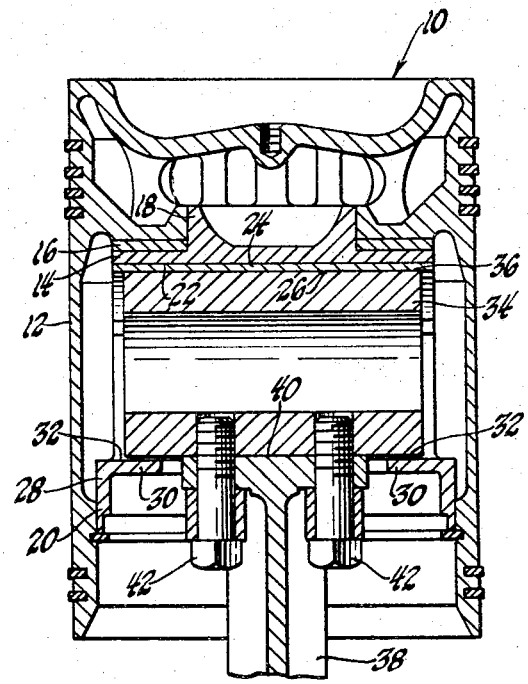
FIGURE 2 is a cross sectional view taken along the plane generally indicated by the line 2—2 of FIGURE 1.

Referring now to the drawings, FIGURES 1 and 2 illustrate a piston and connecting rod assembly generally indicated by numeral 10. The assembly is particularly adapted for use in diesel engines of the two-stroke cycle type and includes a piston 12 rotatably carried on a piston carrier 14 which receives downwardly acting forces from the piston 12 through a thrust ring 16. Laterally acting forces are received through upper and lower pilots 18 and 20 respectively which engage corresponding surfaces on the piston 12.

The central portion of the piston carrier includes a transversely extending arcuate recess 22 within which is secured a bearing shell 24 having an arcuate surface 26 forming a portion of a right circular cylinder. Surface 26 may, if desired, include suitable grooves (not shown) for carrying lubricant over the surface of the bearing. The carrier 14 also includes a skirt-like sidewall 28 which carries opposed bosses 30. Bores 32 located in the bosses 30 form a lateral opening through the carrier substantially coaxial with the bearing shell 24.

A cylindrical piston pin 34 having an elliptical outer surface 36 is received within bores 32 of the carrier 14 with its surface in load transmitting engagement with the surface 26 of bearing shell 24. The assembly is completed by connecting rod 38 having at its upper end a curved recess 40 in which the piston pin 34 is retained by a pair of bolts 42.

Lubricating oil is supplied to the underside of the piston and carrier assembly by means not shown so that, during reciprocating action of the piston, oil is made available to lubricate the surfaces of the piston pin and bearing shell.

Figure 3:
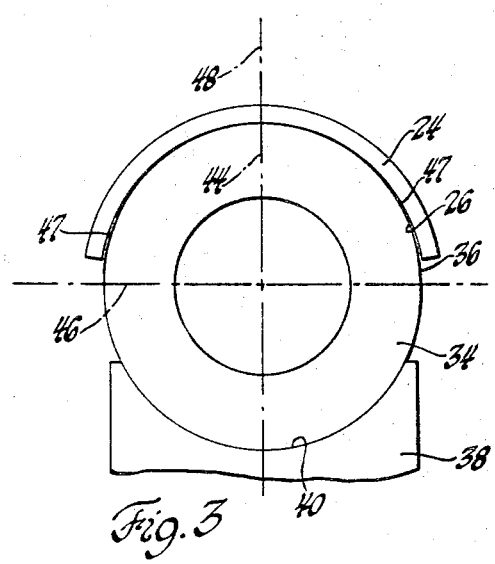
FIGURE 3 is a diagrammatic view of the essential bearing elements showing the assembly in a centered position.
Figure 4:
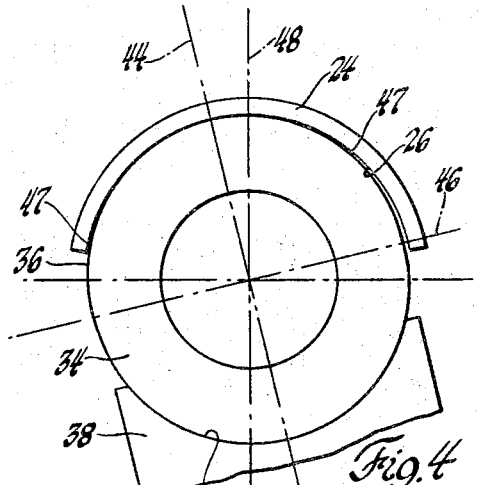
FIGURE 4 is a diagrammatic view similar to FIGURE 3 but showing the assembly in a position of extreme oscillation.

Referring now particularly to FIGURES 3 and 4, the piston pin, bearing shell and the end of the connecting rod are shown diagrammatically. As previously mentioned, the inner surface 26 of the bearing shell is arcuate in cross section whereas the piston pin 34 has an outer surface 36 of elliptical cross section.

The elliptically-shaped pin is carried on the connecting rod with its minor diametral plane 44 in alignment with the connecting rod axis. Accordingly, the major diametral plane 46 of the ellipse is located perpendicular to the axis of the rod. The elliptical surface is formed so that its smallest curvature lies at the point of intersection of the surface with minor diametral plane 44 and this curvature is preferably as great as or slightly greater than the curvature of the arcuate bearing surface 26. The curvature of the surface then increases to a maximum at the points of intersection with major diametral plane 46 located near the edges of the bearing surface.

With the foregoing arrangement, the piston pin surface conforms rather closely to the bearing surface in the area surrounding the minor diametral plane 44 but as the distance from this plane increases, the clearance between the piston pin and bearing surfaces increases until it reaches a maximum at the edge of the bearing insert or near the major diametral plane 46. This forms clearance wedges 47 where lubricating oil may enter between the piston pin and bearing surfaces at the edges of the bearing shell.

Since forces transmitted from the piston to the connecting rod must act in the direction of the connecting rod axis, the central portion of the piston pin surface, adjacent the location of the minor diametral plane, normally remains in force transmitting relation with the bearing surface at all positions of oscillation. Therefore, as the piston pin oscillates from the centered position of FIGURE 3 to the extreme position of FIGURE 4, one of the clearance wedges 47 is moved up closer to the central axial plane 48 of the bearing shell, permitting oil to be worked in between the load carrying surfaces.

Since the highest gas loads occur when the piston is near the top dead center position shown in FIGURE 3, it is natural that the oil tends to be squeezed out of the bearing during this portion of the cycle. However, when the bearing then oscillates to an extreme position, shown in FIGURE 4, the clearance wedge works up toward the central plane 48 and tends to replenish the oil supply in this location. Then as the piston pin oscillates back under lighter load conditions, the piston pin surface rides over the oil film, which remains to lubricate the surfaces during the next high load portion of the cycle.

While the foregoing description has specifically disclosed an elliptically-shaped piston pin used with an arcuate bearing shell, it should be apparent that other piston pin configurations could be used within the scope of the inventive concept involved to provide clearance at the edges of the bearing shell and work oil in between the surface by the relative oscillation of the components. The general requirements of such a design would be that the central load carrying portion of the piston pin conform relatively closely to the bearing shell contour while the portions outboard of the main load carrying portion should be relieved somewhat to provide for the entrance of oil at the edges of the bearing and the carrying of oil toward the center of the bearing shell upon oscillation of the piston pin in the bearing.

Although the foregoing construction is intended primarily for use as a piston pin bearing configuration for two-cycle engines wherein continuous unidirectional loading of the piston pin occurs, the invention is not limited to such use and accordingly the invention is intended to be limited only by the language of the following claims.

I claim:
1. Bearing means between relatively oscillatable members connected in load transmitting relationship, said bearing means comprising
   a transversely extending bearing carried by one of said members and having an inwardly curved arcuate load transmitting surface and
   a curved thrust surface on the other of said members and in load transmitting relationship with said bearing surface,
   said thrust surface comprising under all operating conditions a portion of an outwardly curved oblong cylinder having a major diametral plane and a minor diametral plane, said thrust surface having a transverse central portion centered on said minor diametral plane and conforming approximately to but having a curvature not less than the curvature of said bearing surface, said thrust surface having a minimum curvature at its intersection with said minor diametral plane and approaching a maximum curvature at its intersection with said major diametral plane whereby to provide relieved portions of said thrust surface circumferentially spaced on either side of said central portion to assist the entry of lubricant between said surfaces during relative oscillation of said members.

2. Bearing means as defined in claim 1 wherein the oblong cylinder of which said thrust surface comprises a portion is elliptical in shape.

3. Bearing means as defined in claim 2 wherein the primary direction of load between said members is along a plane fixed with respect to said another member and coplanar with the minor diametral plane of said elliptical cylinder.

References Cited
UNITED STATES PATENTS 3,053,595 9/1962 Dilworth _____ 287—20
3,056,638 10/1962 Hovde _____ 123—193

MARTIN P. SCHWADRON, *Primary Examiner.*
M. FEIGENBAUM, L. L. JOHNSON,
*Assistant Examiners.*